United States Patent [19]
Chianale et al.

[11] Patent Number: 5,906,431
[45] Date of Patent: May 25, 1999

[54] DEVICE FOR CONTROLLING THE ORIENTATION OF THE MOVABLE REFLECTOR OF A MOTOR VEHICLE HEADLIGHT

[75] Inventors: Gianpaolo Chianale, Cimena; Franco Valente, Turin, both of Italy

[73] Assignee: Magneti Marelli S.P.A., Milan, Italy

[21] Appl. No.: 08/810,345

[22] Filed: Feb. 27, 1997

[30] Foreign Application Priority Data

Feb. 27, 1996 [IT] Italy .................................. TO96A0140

[51] Int. Cl.$^6$ ...................................................... F21M 3/20
[52] U.S. Cl. ........................... 362/515; 362/514; 362/528; 362/529; 362/530; 362/531; 362/524; 362/273; 362/423; 362/421
[58] Field of Search ...................................... 362/514, 515, 362/524, 528, 523, 529, 531, 532, 418, 427, 287, 319, 322, 324, 463, 512, 273, 423, 421

[56] References Cited

U.S. PATENT DOCUMENTS

| | | | |
|---|---|---|---|
| 5,063,480 | 11/1991 | McMahan et al. . | |
| 5,077,642 | 12/1991 | Lisak | 362/463 |
| 5,359,499 | 10/1994 | Denley | 362/512 |
| 5,365,414 | 11/1994 | Chikada et al. | 362/512 |
| 5,381,313 | 1/1995 | Chojo | 362/512 |
| 5,386,349 | 1/1995 | Wheat et al. . | |
| 5,446,631 | 8/1995 | Chikada . | |

FOREIGN PATENT DOCUMENTS 2 702 184  9/1994  France .
39 40 283  6/1991  Germany .

*Primary Examiner*—Thomas M. Sember
*Attorney, Agent, or Firm*—Armstrong, Westerman, Hattori, McLeland, & Naughton

[57] ABSTRACT

The movable reflector of the headlight of a motor vehicle can be orientated by means of an orientation adjustment device located inside the body of the headlight. The orientation of the reflected light beam is controlled with the help of an adjustable graduated scale which is connected to the reflector and which can move with respect to a stationary indicator fixed to the headlight, so as to indicate the changes in orientation of the reflector. The graduated scale is set to zero by means of a manual adjustment carried out by specialized personnel using a special tool, once the reflector has been correctly orientated by means of the adjustment device. The stationary indicator and the graduated scale are located so that they are clearly visible inside the headlight, beneath the transparent cover of a porthole which can be opened in order to set the scale to zero. In a modified version of the control device, the graduated scale is stationary and is mounted on the inside of the transparent cover so that it cannot be removed. A movable indicator, connected to the reflector, slides along the scale indicating the changes in orientation of the reflector. The graduated scale is set to zero by inserting the special tool through a hole in the cover.

6 Claims, 2 Drawing Sheets

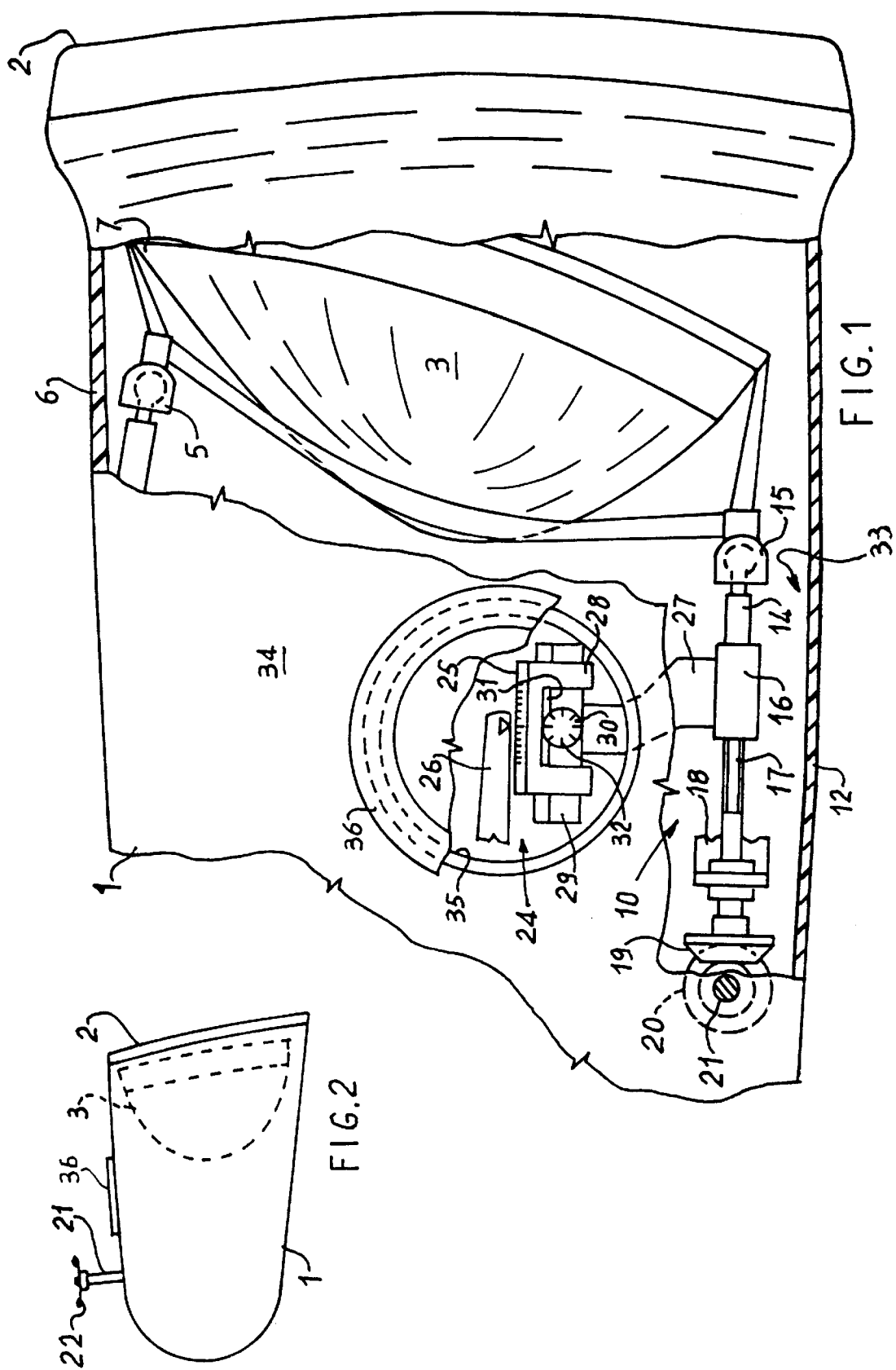

DEVICE FOR CONTROLLING THE ORIENTATION OF THE MOVABLE REFLECTOR OF A MOTOR VEHICLE HEADLIGHT

BACKGROUND OF THE INVENTION

The present invention relates to a device for controlling the orientation of the movable reflector of a motor vehicle headlight and more specifically to a device for displaying this orientation by means of a graduated scale coupled with an adjustment device which is used to change the orientation of the movable reflector in a horizontal and/or vertical plane.

French patent application No. 2,702,184 discloses a device for controlling and adjusting the orientation of the reflector of a motor vehicle headlight, which device comprises a ball-and-socket joint element to allow the reflector to move in a horizontal and/or vertical plane, actuating means to rotate the reflector about the balland-socket joint, and a graduated reference scale mounted on a part fixed to the outside of the headlight, with a movable indicator, also on the outside of the headlight and fixed to the reflector, being able to slide with respect to this scale so as to show the position of the said reflector, relative to an initial position, which has been set once the reflector has been orientated in the correct position.

The initial position of the graduated scale is set by sliding the scale with respect to the movable indicator after first having loosened a locking screw which is then tightened again once the adjustment has been made, so as to fix the scale in the zero position.

This known device is not very reliable over time on account of the fact that both the graduated scale and the actuating means are exposed to dust and splashes of water which impair their ability to function correctly and prevent the orientation of the reflector from being checked quickly and easily on the graduated scale.

SUMMARY OF THE INVENTION

The object of the invention is to produce a device for adjusting the orientation of the reflector of a motor vehicle headlight which does not have the drawbacks encountered in the known model described above and which in particular prevents untrained users from accessing the adjustment elements and in addition allows the state of orientation of the reflector to be checked quickly and directly without having to touch the device or use any special tools.

The invention provides a device for controlling the orientation of the movable reflector of a motor vehicle headlight, the reflector being located inside the headlight, and the device comprising at least one ball-and-socket joint element to allow the reflector to move with respect to the headlight in a horizontal and/or vertical plane, an adjustment device to move the reflector around the ball-and-socket joint element, and display means showing the relative orientation of the reflector, characterized in that the adjustment device and the display means are mounted inside the headlight; the display means being supported by a section of an upper wall of the headlight, while the adjustment device is positioned close to the wall at the opposite end from the reflector.

BRIEF DESCRIPTION OF THE DRAWINGS

This and other features of the invention will become clearer from the following description of a preferred embodiment, which description is given by way of nonlimiting example with reference to the attached drawings, in which:

FIG. 1 is a plan view, in partial cross section, of the device for controlling the orientation of the movable reflector of a headlight according to the invention;

FIG. 2 shows a side view on a reduced scale of a headlight incorporating the device of FIG. 1.

DETAILED DESCRIPTION OF THE INVENTION

Figure 3:
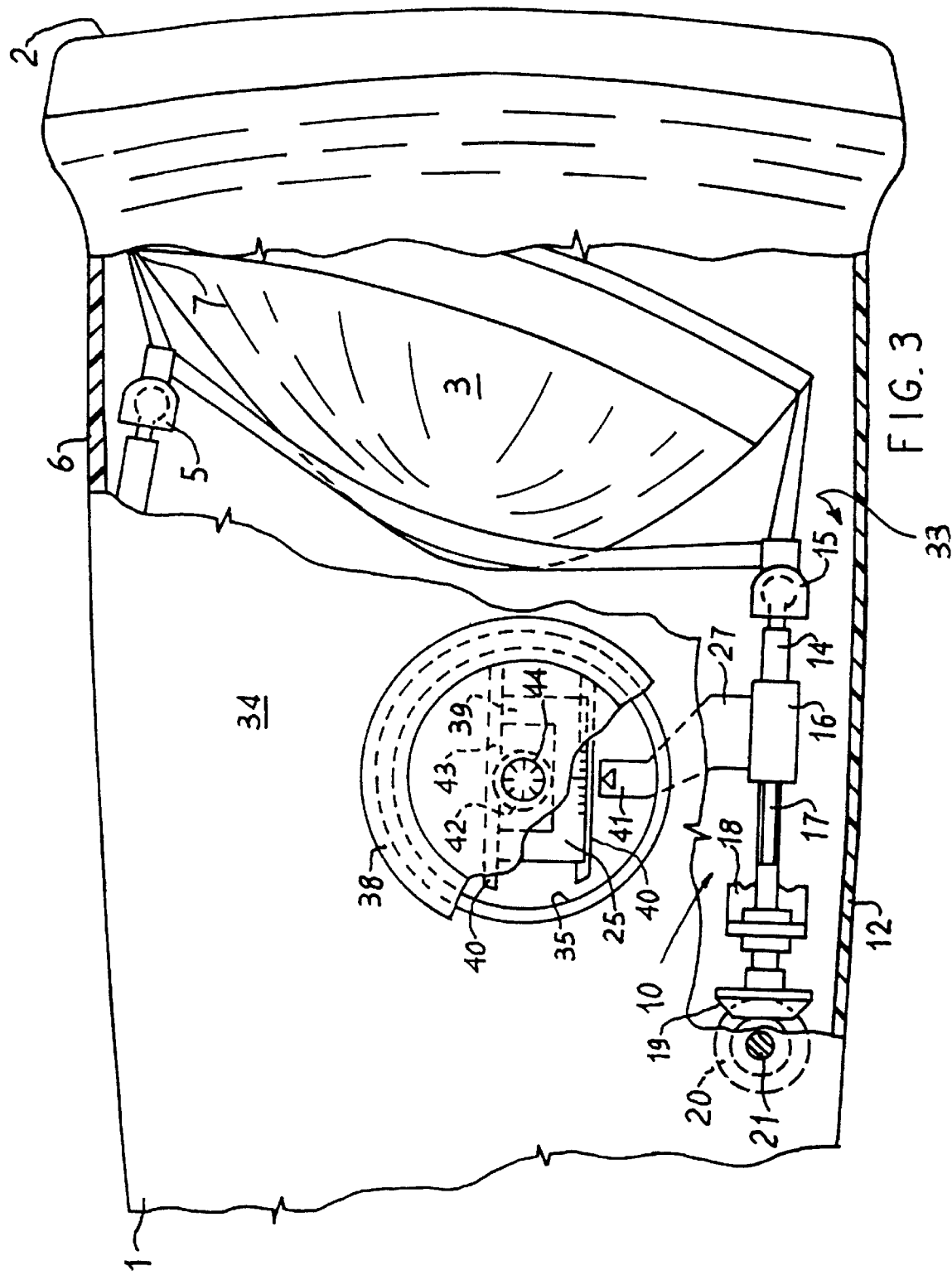
FIG. 3 shows a different embodiment of the device of FIG. 1.

With reference to FIG. 1, the numeral 1 indicates a motor vehicle headlight in partial cross section; the headlight 1 consists of a front cover 2 made of glass, through which the beam of light reflected by a reflector 3 passes; the front cover 2 is fixed around its periphery to the body 4 of the headlight which is sealed off so as to form an airtight environment which is protected from external pollutants; the reflector 3 consists of a concave mirror surface, shaped so as to project the beam of light produced by a source (not shown) asymmetrically into the space in front of the vehicle; the reflector 3 can move in a horizontal and/or vertical plane as a result of rotation about at least one joint 5; the joint 5 preferably consists of a ball-and-socket joint 5 anchored on the one hand to a point (not visible) on a lateral wall 6 of the body 4 of the headlight 1, and connected on the other hand to the front edge 7 of the reflector 3.

The reflector 3 is rotated with respect to the joint 5 by means of an adjustment device 10 which is located adjacent to a bottom wall 33 and to a lateral wall 12, opposite the wall 6, of the headlight; this device 10 consists of a tie rod 14 connected to the reflector 3 by means of another ball-and-socket joint 15; the tie rod 14 is rigidly connected to an element 16 containing an internal thread into which a screw 17 engages, this screw 17 being able to rotate on a support 18 which is integral with the body of the headlight 1; the screw 17 is rotated by means of a pair of bevel gears 19, 20, the gear 20 of which is mounted on a vertical shaft 21 that projects via the upper wall (FIG. 2) outside the body of the headlight 1; the shaft 21 is usually provided with a manually actuated knob 22; however, as an alternative, it may be connected to an electric motor controlled by an electronic control unit, neither of which are shown.

The adjustment device 10 is connected to means 24 which display the orientation of the reflector 3, these means being positioned in an upper wall 34 of the body of the headlight and essentially consisting of a graduated scale 25 which can be adjusted with respect to a reference indicator 26; the display means 24 are located inside the headlight 1 in order to protect them from the dust and dirt which are inevitably found outside the headlight, so that the state of orientation of the reflector 3 can be checked quickly and easily at any time.

Made in one piece with the element 16 is a support arm 27 that supports, at one of its ends, the adjustable graduated scale 25 which is located facing the stationary indicator 26 that is connected to the headlight 1; the graduated scale 25 comprises a cursor 28 that slides along a guide 29 attached to the end of the arm 27 and is moved by means of a pinion 30 having a vertical axis and engaging with a set of teeth 31 on the cursor 28; the pinion 30 is provided with an upward-facing front ring gear 32 which is designed to engage with a special tool, a "TORX" screwdriver in this particular example, which is well known to those of the art and is used to set the position of the cursor 28 to zero on the indicator 26 during the headlight calibration operation.

The upper wall 34 of the headlight 1 is provided with a porthole 35 which is located in the region of the display device 24; the porthole 35 is usually closed off with a transparent cover 36 so as to enable the graduated scale 25 and the indicator 26 to be seen from the outside; however, the cover 36 can be removed in order to set the position of the indicator 26 to zero on the scale 25 each time the orientation of the reflector is adjusted by means of the prescribed optic means (reference screen), for example as soon as the new vehicle leaves the factory and then each time it is serviced.

According to a variant of the device conforming to the invention (FIG. 3), so as to eliminate the need to remove the cover 36 (FIG. 1)—together with all the time this wastes, especially if adjustment is to be carried out on a large number of vehicles, as is the case, for example, when vehicles come off the assembly line—and so as to eliminate the risk of losing it, the cover 36 is replaced with a transparent cover 38 which closes off the porthole 35 securely, for example by means of a snap-fastening closure, such that the cover 38 cannot be removed; in this case, the graduated scale 25 is mounted on the cover 38, on its face facing the inside of the headlight 1, and consists of a cursor 39 that slides on two guides 40 on the said cover; a reference indicator 41 is securely mounted on the arm 27 and is therefore movable, following every movement of the reflector 3.

The indicator 41 extends inside the headlight 1, underneath the transparent cover 38, with its end close to the graduated scale 25; the cursor 39 can be moved with respect to the indicator 41 so as to set the display of the orientation of the reflector 3 to zero, by means of a pinion 42 which pivots on the cover 38 and engages in a set of teeth 43 on the cursor 39; similarly to the version shown in FIG. 1, the pinion 42 can be rotated only using a "TORX" screwdriver inserted via a hole 44 in the cover 38.

We claim:

1. A device for controlling an orientation of a movable reflector of a motor vehicle headlight, said reflector being located inside said headlight, the device comprising:

at least one ball-and-socket joint element to allow the reflector to move with respect to said headlight in a horizontal and/or vertical plane;

an adjustment device, mounted inside said headlight close to a wall of said headlight opposite from said reflector, to move the said reflector around said at least one joint element; and display means, mounted inside said headlight and supported by a section of an upper wall of said headlight, showing a relative orientation of the said reflector, wherein said adjustment device includes a screw which rotates inside said headlight and a nut which translates and is coupled to said screw and connected to said display means and to the said reflector, said screw being rotated by a knob which is outside of said headlight and is connected to the said screw by a pair of gears.

2. A device according to claim 1, wherein said display means comprises:

a stationary indicator fixed to said headlight; and a graduated scale which is connected, via a support arm, a movable element and a corresponding control tie rod, to said reflector, said graduated scale being adjustable with respect to said stationary indicator; and wherein said headlight comprises a porthole which is located in the region of the said display means and is closed off by a transparent cover so as to enable the orientation of the said reflector to be checked quickly by eye, said cover being removable so as to allow said graduated scale to be adjusted to correspond to a predetermined orientation of the said reflector.

3. A device according to claim 1, wherein said display means comprises:

a movable indicator which is connected, via a support arm, a movable element and a corresponding control tie rod, to said reflector; and a cursor on a graduated scale which is adjustable with respect to the said movable indicator; and wherein said headlight comprises a porthole which is closed off by a fixed and transparent cover and is located in the region of the said display means so as to enable the orientation of the said reflector to be checked quickly by eye, said graduated scale being mounted on the said cover inside said headlight.

4. A device according to claim 3, wherein said cover is provided with guides designed to support said cursor on said graduated scale; and wherein said cursor can slide along said guides in both directions with respect to an intermediate position.

5. A device according to claim 3, wherein said cursor on said graduated scale is moved via an adjustment means having a pinion engaging with a set of teeth on said graduated scale, said pinion being provided with a front ring gear designed to engage with an adjustment tool.

6. A device according to claim 5, wherein said cover is provided with an aperture in the region of the said adjustment means, said aperture permitting passage of the said adjustment tool so that it can adjust said cursor with respect to the said indicator to correspond to a predetermined orientation of said reflector.

* * * * *